(12) United States Patent
Moon et al.

(10) Patent No.: US 12,009,522 B2
(45) Date of Patent: Jun. 11, 2024

(54) ANODE FOR LITHIUM METAL BATTERY AND LITHIUM METAL BATTERY COMPRISING THE SAME

(71) Applicant: LG CHEM, LTD., Seoul (KR)

(72) Inventors: Jaewon Moon, Daejeon (KR); Hyungkyun Yu, Daejeon (KR); Hyung Seok Han, Daejeon (KR); Ki Hoon Paeng, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 384 days.

(21) Appl. No.: 16/500,633

(22) PCT Filed: Dec. 21, 2018

(86) PCT No.: PCT/KR2018/016500
§ 371 (c)(1),
(2) Date: Oct. 3, 2019

(87) PCT Pub. No.: WO2019/125064
PCT Pub. Date: Jun. 27, 2019

(65) Prior Publication Data
US 2020/0099058 A1 Mar. 26, 2020

(30) Foreign Application Priority Data

Dec. 22, 2017 (KR) .................. 10-2017-0178759
Dec. 20, 2018 (KR) .................. 10-2018-0166735

(51) Int. Cl.
*H01M 4/74* (2006.01)
*H01M 4/02* (2006.01)
(Continued)

(52) U.S. Cl.
CPC ........... *H01M 4/742* (2013.01); *H01M 4/134* (2013.01); *H01M 4/661* (2013.01); *H01M 10/0525* (2013.01); *H01M 2004/027* (2013.01)

(58) Field of Classification Search
CPC ........... H01M 4/72–808; H01M 4/134; H01M 4/661; H01M 4/742; H01M 10/0525; H01M 2004/027
See application file for complete search history.

(56) References Cited

U.S. PATENT DOCUMENTS 9,331,339 B2 * 5/2016 Konishi .................. C22F 1/04
9,755,228 B2 9/2017 Yang
(Continued)

FOREIGN PATENT DOCUMENTS

| JP | 11-67217 A | 3/1999 |
|----|-----------|--------|
| JP | 11-67218 A | 3/1999 |

(Continued)

OTHER PUBLICATIONS

JP-2007277641-A English machine translation (Year: 2023).*
(Continued)

*Primary Examiner* — Ula C Ruddock
*Assistant Examiner* — Armindo Carvalho, Jr.
(74) *Attorney, Agent, or Firm* — Birch, Stewart, Kolasch & Birch, LLP

(57) ABSTRACT

An anode for a lithium metal battery and a lithium metal battery that contains an anode for a lithium metal battery, wherein 1) using an anode current collector including multiple holes that, independently from each other, form first pores on one side of a metal plate and form second pores having relatively larger diameters than the first pores on the other side of the metal plate, penetrate inside the metal plate, and connect the first pores and the second pores, and 2) a lithium metal layer that is formed so as to face the first pores (Continued)

of the anode current collector. Another embodiment of the present invention provides a lithium metal battery designed such that a separator faces the second pores (pores having relatively large diameters) of the anode current collector, using the anode for a lithium metal battery of one embodiment.

8 Claims, 5 Drawing Sheets

(51) Int. Cl.
  *H01M 4/134* (2010.01)
  *H01M 4/66* (2006.01)
  *H01M 10/0525* (2010.01)

(56) References Cited

U.S. PATENT DOCUMENTS

| | | | | |
|---|---|---|---|---|
| 9,825,328 | B2 * | 11/2017 | Du | H01M 10/0525 |
| 10,340,527 | B2 | 7/2019 | Hama et al. | |
| 2009/0147442 | A1 | 6/2009 | Hiroi et al. | |
| 2009/0246629 | A1 * | 10/2009 | Nagai | H01M 4/70 216/17 |
| 2017/0214059 | A1 | 7/2017 | Komatsu | |

FOREIGN PATENT DOCUMENTS

| | | | |
|---|---|---|---|
| JP | 11067217 | * | 3/1999 |
| JP | 2007277641 A | * | 10/2007 |
| JP | 4994205 B2 | | 8/2012 |
| JP | 2013-69632 A | | 4/2013 |
| JP | 2013-182810 A | | 9/2013 |
| JP | 5539985 B2 | | 7/2014 |
| KR | 10-0447792 B1 | | 9/2004 |
| KR | 10-2011-0045663 A | | 5/2011 |
| KR | 10-2014-0026806 A | | 3/2014 |
| KR | 20160089656 | * | 7/2016 |
| KR | 20160089656 A | * | 7/2016 |
| KR | 10-2017-0055993 A | | 5/2017 |
| KR | 10-2017-0101853 A | | 9/2017 |
| KR | 10-2017-0131649 A | | 11/2017 |
| KR | 20130002750 | * | 1/2018 |
| KR | 20130002750 A | * | 1/2018 |
| WO | WO 2017/188021 A1 | | 11/2017 |

OTHER PUBLICATIONS

International Search Report issued in PCT/KR2018/016500 (PCT/ISA/210), dated Apr. 30, 2019.
European Search Report mailed May 19, 2020 for corresponding EP Application No. 18891822.1.
Nathan et al., "Three-Dimensional Thin-Film Li-Ion Microbatteries for Autonomous MEMS", Journal of Microelectromechanical Systems, vol. 14, No. 5, Oct. 2005, pp. 879-885.

* cited by examiner

[FIG. 1]
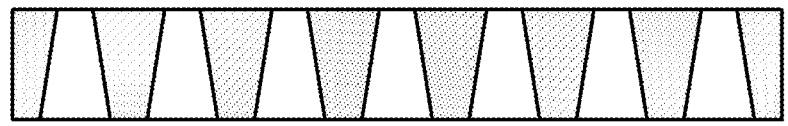
[FIG. 2]
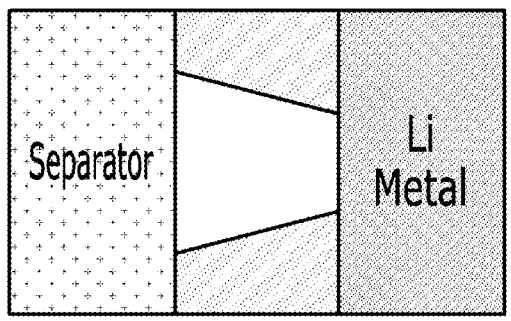
[FIG. 3]
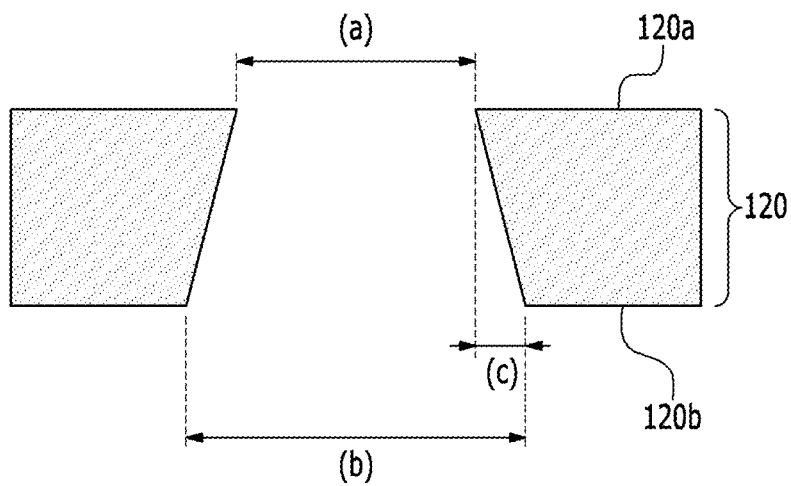

[FIG. 4a]
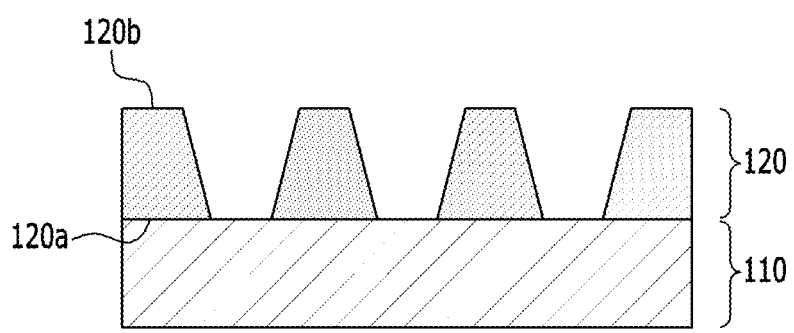
[FIG. 4b]
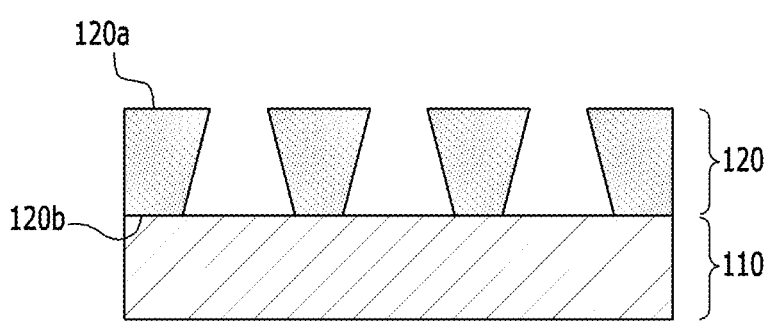

[FIG. 5a]
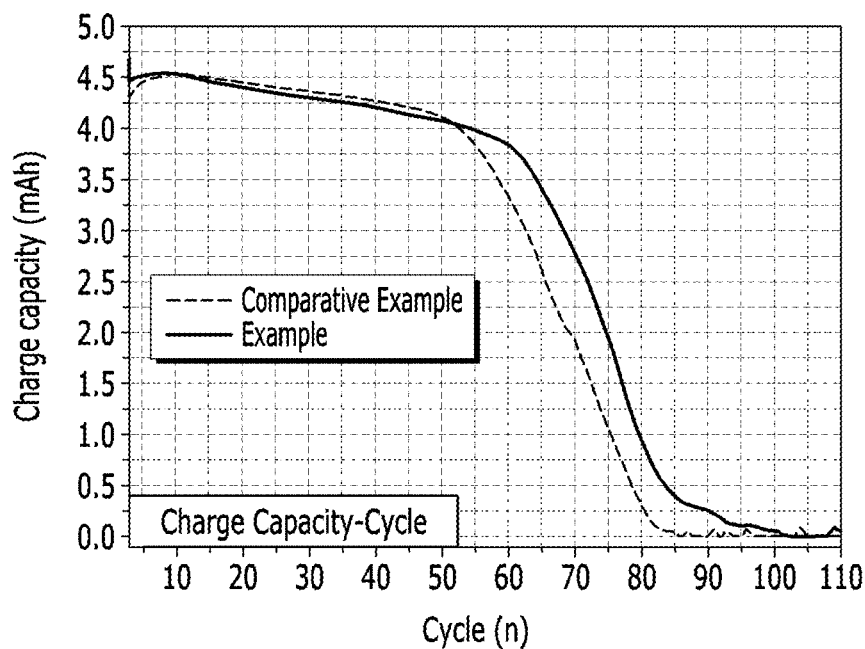
[FIG. 5b]
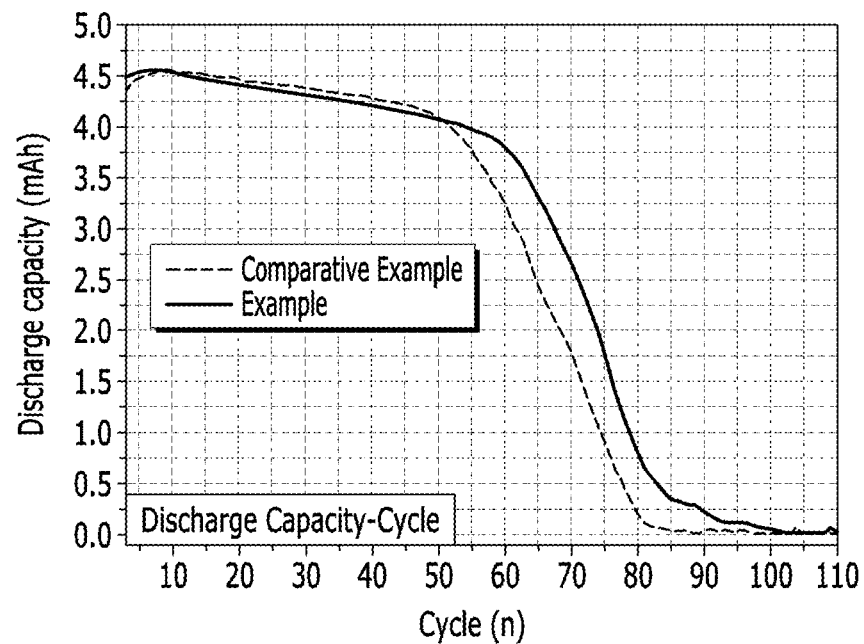

[FIG. 5c]
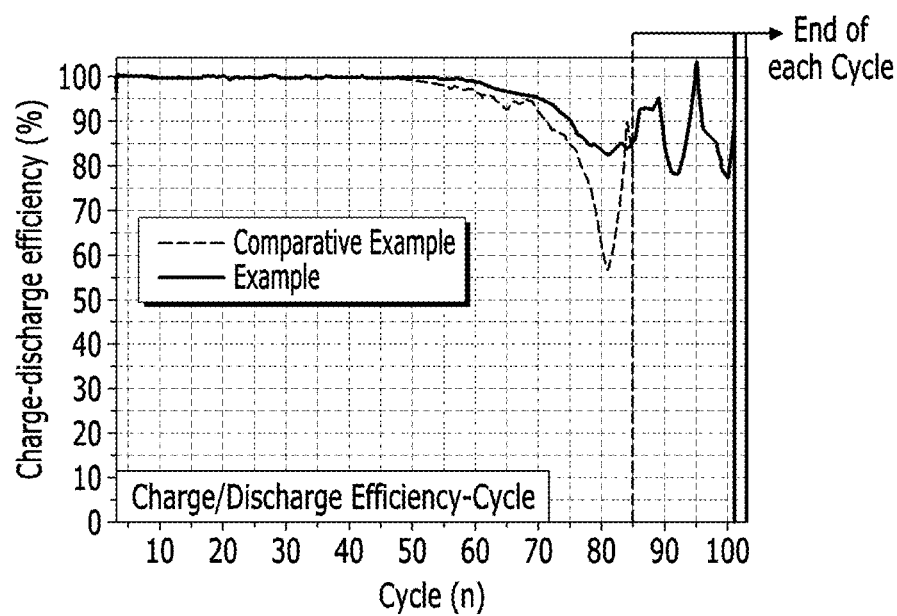

[FIG. 6a]
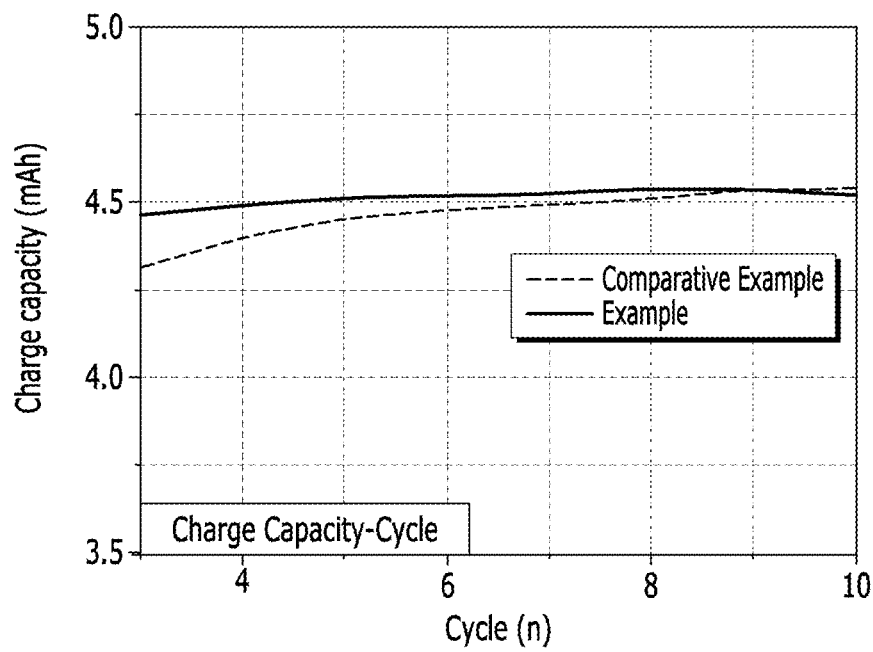
[FIG. 6b]
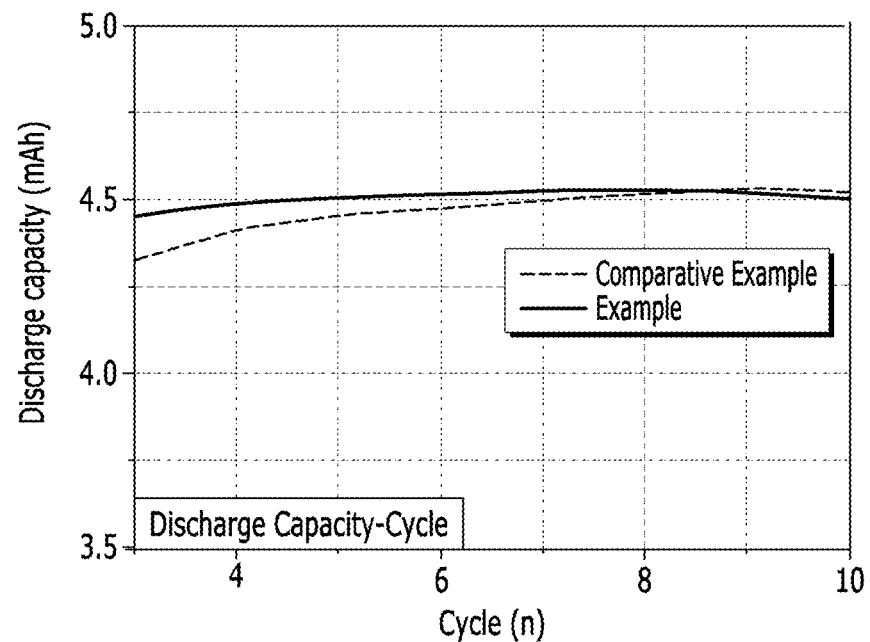

ANODE FOR LITHIUM METAL BATTERY AND LITHIUM METAL BATTERY COMPRISING THE SAME

CROSS-REFERENCE TO RELATED APPLICATION

This application claims the benefit of Korean Patent Application No. 10-2017-0178759 filed on Dec. 22, 2017 and Korean Patent Application No. 10-2018-0166735 filed on Dec. 20, 2018 with the Korean Intellectual Property Office, the disclosures of which are herein incorporated by reference in their entirety.

TECHNICAL FIELD

The present invention relates to an anode for a lithium metal battery and a lithium metal battery including the same.

BACKGROUND ART

A lithium metal battery uses lithium metal as anode active material, and uses electrochemical reactions in which, during the discharge of a battery, lithium metals of an anode lose electrons and move to a cathode through an electrolyte, and during the charge of a battery, lithium ions move to an anode through an electrolyte and are stored in an anode active material. It has an advantage in that it theoretically has very high energy capacity, compared to commercial lithium ion batteries using graphite, etc. as anode active material.

However, the lithium metal battery, despite the above advantage, has a difficulty in securing the reversibility of an anode, due to the structural limitations of anode current collectors suggested up to now, and thus has not been commercialized.

Specifically, in case a Cu-foil commonly used as an anode current collector in a lithium ion battery is simply applied for a lithium metal battery, due to the flat structure without internal pores, it cannot provide various directions and sufficient spaces where lithium ions are electrodeposited during the charge of a battery.

Thus, a porous current collector including foam-shaped pores has been suggested. Such a porous current collector may be favorable for the initial charge because the pores can provide various directions and sufficient spaces where lithium ions are electrodeposited. Nevertheless, due to the random foam-shape of the pores, local blocking of the pores may occur during the repeated charge/discharge of a battery, and the reversibility of an anode may be gradually inhibited.

DISCLOSURE

Technical Problem

The present invention presents an anode current collector that can inhibit local blocking during repeated charge/discharge processes of a battery, while providing various directions and sufficient space where lithium ions can enter during the charge of a lithium metal battery, and provides an optimal anode and battery designing method using the anode current collector.

Technical Solution

Specifically, one embodiment of the present invention provides an anode for a lithium metal battery, wherein 1) an anode current collector (120) including multiple holes that, independently from each other, form first pores on a first side of a metal plate (120a) and form corresponding second pores on a second side of the metal plate, wherein a diameter of the second pores is larger than a diameter of the corresponding first pores (120b), wherein the holes penetrate inside the metal plate and connect the first pores and the second pores, is used, and 2) a lithium metal layer (110) is formed so as to face the first pores of the anode current collector.

Another embodiment of the present invention provides a lithium metal battery designed such that a separator faces the second pores (pores having relatively larger diameters) of the anode current collector, using the anode for a lithium metal battery of one embodiment.

Advantageous Effects

By designing an anode and a lithium metal battery according to the above embodiments, the reversibility of a lithium metal battery can be secured, and the cycle life characteristic of a lithium metal battery can be improved.

DESCRIPTION OF THE DRAWINGS

FIG. 1 is a side view schematically showing the anode current collector of one embodiment FIG. 2 schematically shows a part of a lithium metal battery applying the anode current collector of one embodiment.

FIG. 3 schematically shows a part of the side of the anode current collector designed in a preparation example.

FIG. 4a schematically shows a part of the side of the lithium metal anode designed in one example of the present invention.

FIG. 4b schematically shows a part of the side of the lithium metal anode designed in one comparative example of the present invention.

FIGS. 5a to 5c show the results of conducting charge/discharge of each battery of an example and a comparative examples until the operation is finished.

FIGS. 6a and 6b show the results of conducting charge/discharge of each battery of an example and a comparative example until 10 cycles are progressed, at 25° C.

MODE FOR INVENTION

Throughout the specification, when a part "comprises" a constructional element, unless described to the contrary, other constructional elements are not excluded, but other constructional elements can be further included. The terms indicating a degree such as "about", "substantially", and the like used throughout the specification, when a tolerance of preparation and material unique to the mentioned meaning is presented, is used as a meaning close to the numerical value, and is used to prevent the disclosure mentioning an exact or absolute numerical value for understanding of the invention being unreasonably used by an unprincipled infringer. Throughout the specification, the term "~step" or "step of~" does not mean a "step for~".

Throughout the specification, the term "combination(s) thereof" included in the expression of a Markush type means mixtures or combinations of one or more selected from the group consisting of the constructional elements described in the expression of the Markush type, and means to include one or more selected from the group consisting of the constructional elements.

On the basis of the above definitions, embodiments of the present invention will be explained in detail. However, they are presented only as the illustrations of the invention, and the present invention is not limited thereby but is defined only by the categories of the claims described below.

Anode for a Lithium Metal Battery

One embodiment of the present invention provides an anode for a lithium metal battery, wherein 1) an anode current collector (120) including multiple holes that, independently from each other, form first pores on the first side of a metal plate (120a) and form corresponding second pores on a second side of the metal plate, wherein a diameter of the second pores is larger than a diameter the corresponding first pores (120b), wherein the holes penetrate inside the metal plate and connect the first pores and the second pores, is used, and 2) a lithium metal layer (110) is formed so as to face the first pores of the anode current collector.

The lithium metal anode of one embodiment has a structure wherein the first pores (pores having relatively small diameters) of an anode current collector face a lithium metal layer (110), and the second pores (pores having relatively large diameters) are exposed.

Thus, if the lithium metal anode of one embodiment is used to design a lithium metal battery, the second pores (pores having relatively larger diameters) of an anode current collector face a separator.

In the lithium metal anode of one embodiment, the second pores facing a separator becomes a wide entrance where lithium ions (specifically, lithium ions derived from an electrolyte impregnated in a separator) can easily enter.

As such, the lithium ions entering the wide entrance (second pores) pass through the inside of the anode current collector and move to a lithium metal layer. Here, since various directions and sufficient space where lithium ions penetrating inside the anode current collector can enter are provided from the wide entrance facing a separator (second pores) to the narrow entrance facing a lithium metal layer (first pores), local blocking can be inhibited during repeated charge/discharge processes of a lithium metal battery.

Thus, if the lithium metal anode of one embodiment is used to design a lithium metal battery, the reversibility of a lithium metal anode can be secured, and the cycle life characteristic of a lithium metal battery can be improved.

Hereinafter, each element constituting a lithium metal anode of one embodiment will be explained in detail.

FIG. 1 is a side view schematically showing the anode current collector.

1) As shown in FIG. 1, the multiple holes may, independently from each other, form first pores on one side of the metal plate, penetrate inside the metal plate, and form second pores on the other side of the metal plate. That is, the multiple holes, independently from each other, may have a pore structure that is opened to both sides of the metal plate.

2) Further, in the multiple holes, independently from each other, the diameters of the first pores formed on one side of the metal plate are relatively small, the diameters of the second pores formed on the other side of the metal plate are relatively large, and the diameters of the holes may increase in a direction from the first pores to the second pores. That is, the multiple holes may, independently from each other, have a diameter gradient increasing in a direction from the first pores to the second pores.

FIG. 2 schematically shows a part of the lithium metal battery applying the anode current collector of one embodiment.

As shown in FIG. 2, when a lithium metal battery is formed using the anode current collector of one embodiment, a lithium metal layer may be deposited on a side where the first pores having relatively small diameters are positioned, and a separator may be deposited on a side where the second pores having relatively large diameters are positioned. In addition, a cathode may be deposited on the other side of the separator, and an electrolyte may be impregnated in the separator to form a lithium metal battery.

During the charge of the lithium metal battery, lithium ions of the electrolyte may move from the separator, penetrate the multiple holes, and be electrodeposited on the lithium metal layer. To the contrary, during the discharge of the lithium metal battery, lithium ions may be deintercalated from the lithium metal layer, penetrate the multiple holes, and move to the separator.

In the multiple holes, the second pores adjacent to the separator may provide a wide entrance where lithium ions of the electrolyte can easily enter. Further, the holes with gradually decreasing diameters from the second pores to the first pores may become a passage through which lithium ions of the electrolyte move.

Here, the wide entrance provided by the second pores adjacent to the separator, and the holes with gradually decreasing diameters from the second pores to the first pores, may provide various directions and sufficient space where lithium ions can enter, and provide a favorable structure for inhibiting local blocking during the repeated charge/discharge processes of a battery.

If the anode current collector of one embodiment is used to form a lithium metal battery as shown in FIG. 2, particularly, the reversibility of an anode can be secured, and the cycle life characteristic of a battery can be improved.

Diameter Gradient of Holes

The multiple holes may, independently from each other, have a constant diameter slope, which may gradually decrease, in a direction from the second pores to the first pores.

If a lithium metal battery designed using the lithium metal anode of one embodiment is charged, lithium ions may enter the wide entrance (second pores) as explained above, pass through the holes, and move to a lithium metal layer.

Since the holes penetrating inside an anode current collector and having gradually decreasing diameters provide various directions and sufficient space where lithium ions can enter, local blocking may be inhibited during repeated charge/discharge processes of a lithium metal battery.

The slope of the diameter of the hole may be 30° to 60°, for example 40 to 50°, and within these ranges, various directions and sufficient space where lithium ions can enter can be provided, and it is favorable for inhibiting local blocking during repeated charge/discharge processes of a battery.

However, as explained above, the advantages can be achieved as long as the multiple holes, independently from each other, 1) have a pore structure opened to both sides of the metal plate, and 2) have a structure wherein the diameters of the pores decrease from one side to the other side of the metal plate.

Thus, the diameter of the holes with a constant slope, which may gradually increase, and the slope of the diameter of the holes within a specific range, are no more than examples, and the present invention is not limited thereby.

Each Diameter of the First Pores and the Second Pores

The multiple holes, independently from each other, may have a diameter of the first pores of 1 μm to 100 μm, for example, 50 μm to 70 μm. Referring to FIG. 2, it can be seen that the pore diameter of the side where the lithium metal is deposited is 1 μm to 100 μm, for example 50 μm to 70 μm, in the anode current collector of one embodiment.

In addition, the multiple holes, independently from each other, may have a diameter of the second pores of 7 μm to 700 μm, for example, 200 μm to 350 μm. Referring to FIG. 2, it can be seen that the pore diameter of the side where a separator is deposited is 7 μm to 700 μm, for example 200 μm to 350 μm, in the anode current collector of one embodiment.

Meanwhile, the thickness of the substrate on which the multiple holes are formed, i.e., the metal plate, may be 5 μm to 300 μm, for example 100 μm to 150 μm.

Comprehensively considering the diameter of the first pores, the diameter of the second pores, and the thickness of the metal plate, a diameter may increase by 0.1 μm to 3 μm per 1 μm thickness of the metal plate from the diameter of the first pores to the diameter of the second pores.

However, as explained above, the above advantages can be achieved as long as the multiple holes, independently from each other, 1) have a pore structure that is opened to both sides of the metal plate, and 2) have a structure wherein the diameters of the pores increase from one side to the other side of the metal plate.

Thus, the diameter of the first pores, the diameter of the second pores, the thickness of the metal plate, and the degree of change in the hole diameter inside the metal plate, respectively within a specific range, are no more than examples, and the present invention is not limited thereby.

A Method of Forming Multiple Holes

Meanwhile, the multiple holes, independently from each other, may be formed using soft molding, self-assembly of spherical particles, or photolithography. More specifically, as described below in the examples, photolithography may be used.

Soft molding: First, the multiple holes may be formed on a metal plate using a conical, elliptic conical, or polypyramidal soft mold. The soft mold may consist of an elastic polymer, for example, PDMS (polydimethylsiloxane). Specifically, in order to realize the shape of the soft mold, etching may be progressed using photolithography on a metal or non-metal substrate, and the aimed shape may be transcribed to the elastic polymer. For example, the substrate may be a Si wafer, but is not limited thereto, because all substrates to which photolithography can be applied may be used.

A method of applying a soft mold includes three methods. A method of imparting conductivity to a soft mold itself and using the same, and a method of eliminating only a metal layer using a soft mold as a stamper for patterning, may be mentioned. Specifically, a method of imparting conductivity may include plating Cu ions on the front side of a soft mold by electroless plating, and metal may be sputtered on a soft mold and then the cutting edges may be removed to form pores. If eliminating a metal part on which the pores are formed, the aimed metal plate may be obtained. By using this method, the diameter of the holes, the diameter of the first pores, and/or the diameter of the second pores may be achieved, respectively within the above-explained range.

Self-Assembly of Spherical Particles:

Unlike the above, a shape similar to a soft mold can also be obtained using spherical particles having a Gaussian distribution according to the diameter of the particles. For example, the size of the spherical particles may be 1 μm to 30 μm, and it may be realized by a self-assembly mechanism by liquid-phase precipitation. If spherical particles are dripped on a substrate which is completely dipped in liquid, they are stacked according to particle size by gravity, and a shape wherein a conical, elliptic conical, or polypyramidal shape similar to the soft mold is distributed on the surface may be realized. The diameter of the holes, the diameter of the first pores, and/or the diameter of the second pores may be achieved, respectively within the above-explained range.

Photolithography:

In case photolithography is used, the irradiated light may be UV, which may generally have a wavelength band of 10 nm to 500 nm. More specifically, the central wavelength may be positioned in the range of 300 nm to 500 nm. A photoresist and a photomask are positioned and light is irradiated so that aimed holes may be formed on a metal plate, and a part of metal excluding the photoresist and photomask is etched. In order to form holes having a gradient according to depth, the sizes of the photoresist and photomask may be sequentially controlled to form the multiple holes having a gradient. In this case, the diameter of the holes, the diameter of the first pores, and/or the diameter of the second pores, respectively within the above-explained range, may be achieved.

However, since the above-explained ranges regarding the diameter of the hole, the diameter of the first pores, the diameter of the second pores, etc. are no more than examples, the above illustrated methods and process conditions are also no more than examples for better understanding of one embodiment.

The Shape of Multiple Holes

The multiple holes may, independently from each other, have a shape of a circular truncated cone, an elliptic truncated cone, or a truncated polypyramid by controlling the forming method and conditions. For example, if using a circular conical soft mold, the multiple holes may be formed respectively in the shape of a circular truncated cone. In the shape of a circular truncated cone, the narrower upper side may form the first pore, the wider lower side may form the second pore, and the slope may correspond to the slope of the diameter of the hole. However, the above illustrated shapes are no more than examples, and the present invention is not limited thereto.

Porosity

In the anode current collector of one embodiment, the volume occupied by the multiple holes in the total volume (100 vol %) including the metal plate and the multiple holes may be 50 to 90 vol %. Within this range, various directions and sufficient spaces where lithium ions can enter may be provided, and it is favorable for inhibiting local blocking during the repeated charge/discharge processes of a battery. However, this is no more than an example, and the present invention is not limited thereto.

A Metal Plate

In the anode current collector of one embodiment, the metal plate may consist of copper (Cu), or an alloy of copper (Cu) and other metals.

The metal plate is not specifically limited as long as it consists of Cu or a Cu-alloy material having high conductivity, without inducing chemical changes in a battery.

The metal plate may be a film, a sheet, a foil, etc. having a thickness of 3 to 500 μm, for example, 100 to 150 μm, as explained above, and the above-explained multiple holes may be formed on such a metal plate. Further, the metal plate may have fine unevenness formed on the surface so as to increase adhesion of a lithium metal layer and/or a separator.

A Method of Depositing a Lithium Metal Layer

Meanwhile, as a method of depositing the lithium metal layer on the current collector of one embodiment, a method commonly known in the art may be appropriately selected.

Specifically, the lithium metal layer may be deposited in a battery. For example, by replacing an anode of a common battery with the above-explained anode current collector of one embodiment and then repeating charge/discharge, the lithium metal layer may be deposited on the anode current collector.

A Lithium Metal Battery

Another embodiment of the present invention provides a lithium metal battery including: the anode of one embodiment; a separator facing the second pores of the anode current collector; an electrolyte impregnated in the separator membrane; and a cathode facing the other side of the separator membrane.

The lithium metal battery may be formed by depositing a lithium metal layer on a side where the first pores having relatively small diameters are positioned, depositing a separator on a side where the second pores having relatively large diameters are positioned, depositing a cathode on the other side of the separator, and impregnating an electrolyte in the separator. The construction is as described above in detail with reference to FIGS. 1 and 2.

In case a flat Cu-foil without pores or a porous current collector including foam-shaped pores is used as an anode current collector, there is a severe capacity decrease in a lithium metal battery.

To the contrary, since the lithium metal battery of one embodiment includes the above-explained anode current collector, storage and deintercalation of lithium can be stably achieved in an anode including the above-explained anode current collector during the repeated charge/discharge processes of a battery, thus improving the cycle life characteristic.

Hereinafter, the constructional elements of a battery other than an anode will be explained in detail.

Electrolyte

The lithium metal battery may use an electrolyte including a non-aqueous organic solvent and a lithium salt.

The non-aqueous organic solvent functions as a medium through which ions involved in the electrochemical reactions of a battery can move.

As the non-aqueous organic solvent, a carbonate-based, ester-base, ether-based, ketone-based, alcohol-based, or an aprotic solvent may be used. As the carbonate-based solvent, dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), etc. may be used, and as the ester-based solvent, methyl acetate, ethyl acetate, n-propyl acetate, 1,1-dimethylethyl acetate, methylpropionate, ethylpropionate, γ-butyrolactone, decanolide, valerolactone, mevalonolactone, caprolactone, etc. may be used. As the ether-based solvent, dibutyl ether, tetraglyme, diglyme, dimethoxyethane, 2-methyltetrahydrofuran, tetrahydrofuran, etc. may be used, and as the ketone-based solvent, cyclohexanone etc. may be used. Further, as the alcohol-based solvent, ethyl alcohol, isopropyl alcohol, etc. may be used, and as the aprotic solvent, nitriles such as R—CN (where R is a linear, branched, or cyclic C2-20 hydrocarbon group, and may include a double bond, an aromatic ring, or an ether bond), amides such as dimethylformamide, dioxolanes such as 1,3-dioxolane, sulfolanes, etc. may be used.

The non-aqueous organic solvent may be used alone or in combinations of two or more kinds, and if used in combinations, the mixing ratio may be appropriately controlled according to the aimed performance of a battery, which may be easily understood by an ordinary skilled person in the art.

In addition, in the case of the carbonate-based solvent, it is preferable that a cyclic carbonate and a chain carbonate are used in combination. In this case, the cyclic carbonate and the chain carbonate may be mixed at a volume ratio of about 1:1 to about 1:9 so as to exhibit excellent performance of an electrolyte.

The non-aqueous organic solvent may further include the aromatic hydrocarbon-based organic solvent in addition to the carbonate-based solvent. Here, the carbonate-based solvent and the aromatic hydrocarbon-based organic solvent may be mixed at a volume ratio of about 1:1 to about 30:1.

As the aromatic hydrocarbon-based organic solvent, an aromatic hydrocarbon-based compound of the following Chemical Formula 1 may be used.

[Chemical Formula 1]

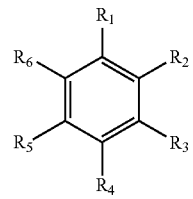

In Chemical Formula 1, $R_1$ to $R_6$ are, independently from each other, hydrogen, a halogen, a C1-10 alkyl group, a C1-10 haloalkyl group, or a combination thereof.

As the aromatic hydrocarbon-based organic solvent, benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzen, 1,2,3-trichlorobenzen, 1,2,4-trichlorobenzene, iodobenzene, 1,2-diiodobenzen, 1,3-diiodobenzene, 1,4-diiodobenzene, 1,2,3-triiodobenzen, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, or a combination thereof may be used.

The non-aqueous electrolyte may further include a vinylene carbonate-based or an ethylene carbonate-based compound of the following Chemical Formula 2 so as to improve the cycle life of a battery.

[Chemical Formula 2]

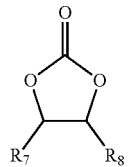

In Chemical Formula 2, $R_7$ and $R_8$ are, independently from each other, hydrogen, a halogen group, a cyano group (CN), a nitro group ($NO_2$) or a C1-5 fluoroalkyl group, and at least one of the $R_7$ and $R_8$ is a halogen group, a cyano group (CN), a nitro group ($NO_2$), or a C1-5 fluoroalkyl group.

As representative examples of the ethylene carbonate-based compound, difluoroethylene carbonate, chloroethylene carbonate, dichloroethylene carbonate, bromoethylene carbonate, dibromoethylene carbonate, nitroethylene carbonate, cyanoethylene carbonate, fluoroethylene carbonate, etc. may be mentioned. In case the vinylene carbonate-based or ethylene carbonate-based compound is further used, the amount used may be appropriately controlled to improve the cycle life.

The lithium salt is a material that is dissolved in the non-aqueous organic solvent, and acts as a source of lithium ions in a battery, thus enabling the basic operation of a lithium secondary battery and facilitating the movement of lithium ions between a cathode and an anode. As representative examples of the lithium salt, $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein x and y are natural numbers), LiCl, LiI, $LiB(C_2O_4)_2$ (lithium bis(oxalato) borate; LiBOB), or combinations thereof may be mentioned, and these may be included as supporting electrolytic salts. The concentration of the lithium salt is preferably in the range of 0.1 to 2.0 M. If the concentration of the lithium salt is within the above range, an electrolyte may have appropriate conductivity and viscosity, and thus excellent electrolyte performance may be exhibited, and lithium ions may effectively move.

Separator

The separator separates the cathode and the anode and provides a passage for lithium ions, and those commonly used in a lithium battery may be used without specific limitations. That is, those having low resistance to the movement of ions of an electrolyte and having an excellent electrolyte wetting property may be used. For example, it may be selected from glass fiber, polyester, Teflon, polyethylene, polypropylene, polytetrafluoroethylene (PTFE), or combinations thereof, and it may be in the form of a non-woven fabric or woven fabric. For example, in a lithium ion battery, a polyolefin-based polymer separator such as polyethylene, polypropylene, etc. is mainly used, and a coated separator including a ceramic component or a polymer material may be used so as to secure heat resistance or mechanical strength, and it may be optionally used in a monolayer or a multilayer structure.

Cathode

The cathode may include a cathode current collector, and a cathode mixture layer positioned on the cathode current collector.

The cathode is prepared by mixing an active material and a binder, and if necessary, a conductive material, a filler, etc. in a solvent to prepare an electrode mixture in the form of a slurry, and coating the electrode mixture on an electrode current collector. Such a method of preparing an electrode is well known in the art, and thus detailed explanations thereof will be omitted herein.

As the cathode active material, a layered compound such as lithium cobalt oxide ($LiCoO_2$), lithium nickel oxide ($LiNiO_2$), etc., or a compound substituted with one or more transition metals; a lithium manganese oxide such as the chemical formula $Li_{1+x}Mn_{2-x}O_4$ (wherein x is 0~0.33), $LiMnO_3$, $LiMn_2O_3$, $LiMnO_2$, etc.; lithium copper oxide ($Li_2CuO_2$); a vanadium oxide such as $LiV_3O_8$, $LiFe_3O_4$, $V_2O_5$, $Cu_2V_2O_7$, etc.; a Ni site type of lithium nickel oxide represented by the chemical formula $LiNi_{1-x}M_xO_2$ (wherein M=Co, Mn, Al, Cu, Fe, Mg, B, or Ga, and x=0.01~0.3); a lithium manganese composite oxide represented by the chemical formula $LiMn_{2-x}M_xO_2$ (wherein M=Co, Ni, Fe, Cr, Zn, or Ta, and x=0.01~0.1), or $Li_2Mn_3MO_8$ (wherein M=Fe, Co, Ni, Cu, or Zn); a lithium manganese composite oxide of a spinel structure, represented by $LiNi_xMn_{2-x}O_4$, $LiMn_2O_4$, wherein a part of Li is substituted with an alkali earth metal ion; a disulfide compound; $Fe_2(MoO_4)_3$, etc, may be mentioned, but is not limited thereto.

The cathode current collector may be generally formed with a thickness of 3~500 μm. Such a cathode current collector is not specifically limited as long as it has high conductivity without inducing chemical changes in a battery. For example, stainless steel, aluminum, nickel, titanium, baked carbon, or aluminum, or stainless steel of which surface is treated with carbon, nickel, titanium, silver, etc., may be used. The collector may have fine unevenness on the surface to increase adhesion of the cathode active material, and it may be in various forms such as a film, a sheet, a foil, a net, a porous body, a foamed body, a non-woven fabric body, etc.

The conductive material is not specifically limited as long as it has conductivity without inducing chemical changes in a battery, and for example, graphite such as natural graphite or artificial graphite; carbon black such as carbon black, acetylene black, Ketjen black, channel black, furnace black, lamp black, summer black, etc.; a conductive fiber such as carbon fiber or metal fiber, etc.; a metal powder such as fluorinated carbon, aluminum, nickel powder, etc.; conductive whiskers such as zinc oxide, potassium titanate, etc.; a conductive metal oxide such as titanium oxide, etc.; or a conductive material such as polyphenylene derivatives, etc., may be used.

The lithium metal battery of one embodiment may not only be used in a battery cell used as a power supply of a small-sized device, but may also be used as a unit battery in medium and large sized battery modules including multiple battery cells.

Preparation Example 1

As shown in FIG. 3, the first pores having relatively small diameters were formed on one side (120a) of a metal plate, the second pores having larger diameters than the first pores were formed on the other side (120b) of the metal plate, and an anode current collector (120) including multiple holes that penetrate inside the metal plate and connect the first pores and the second pores was prepared.

Specifically, as a metal plate, which is a base material of the anode current collector (120), an electrolytic copper foil with a thickness of 16 μm was used.

On one side of the electrolytic copper foil, a first photoresist layer was uniformly deposited. Further, on the photoresist layer, a first photomask including a circular opening with a diameter of 81 μm was attached, and then UV was irradiated at a light quantity of 90 to 110 mJ/cm², thereby forming a pattern with the first photomask.

Thereafter, the first photomask was removed, and in order to remove the first photoresist layer on which a pattern by the first photomask was formed, it was immersed in a developer consisting of NaOH and $H_2O$, thus removing the photoresist layer existing on a part to be etched. In order to progress wet etching to form pores in the metal, etching was conducted using an etching solution consisting of $HNO_3$ and $H_2O$. However, in addition to the above process, common positive/negative photolithography processes may be applied to etch the metal and manufacture a pattern.

Thereafter, while the sizes of photomasks were gradually reduced from the 81 μm opening to a photomask including a circular opening with a diameter of 67.5 μm, thus replacing with photomasks with gradually decreasing circular opening diameters, the processes of exposure, development, etching, and stripping were repeated. Herein, each photomask included a circular opening formed at the same interval, based on each pore central point.

Finally, an anode current collector (120) wherein the diameter of the pores formed on one side (120a) of the electrolytic copper foil was 67.5 μm (first pores), the diameter of the pores formed on the other side (120b) of the electrolytic copper foil was 81 μm (second pores), and multiple holes penetrating inside the electrolytic copper foil and connecting the first pores and the second pores were formed, was obtained.

In the anode current collector (120), each hole had a gradient of the gradually increasing diameter from the diameter of the first pores (the diameter of the hole increased by 0.84375 μm per 1 μm thickness of the electrolytic copper foil) to the diameter of the second pores, while penetrating inside the metal plate, and had porosity of 20-30 vol %.

BEST MODE

Hereinafter, the actions and the effects of the invention will be explained in more detail through specific examples. However, these examples are presented only as illustrations of the invention, and the scope of the right of the invention is not limited thereby.

Example 1

A lithium metal anode was prepared using the anode current collector (120) of Preparation Example 1, in a structure wherein the first pores (pores having relatively small diameters) of the anode current collector face a lithium metal layer.

Specifically, as shown in FIG. 4a, a side (120a) on which the pores having relatively small diameters are positioned in the anode current collector of Preparation Example 1, and a lithium foil (thickness: 20 μm) were made to face each other, followed by roll pressing such that the current collector and the lithium metal layer may be laminated without separation, and blanking to a circular shape (diameter: 1.5 cm), thus obtaining the lithium metal anode of Example 1.

Example 2

A lithium metal battery was prepared using the lithium metal anode of Example 1, in a structure wherein the second pores (pores having relatively large diameter) face a separator.

Specifically, $LiNi_{0.8}Mn_{0.1}Co_{0.1}O_2$ as a active material, carbon black as a conductive material, and polyvinylidene fluoride (PVdF) as a binder were mixed at a weight ratio of the cathode active material:the conductive material:the binder of 96:2:2, and a solvent of NMP was added to the mixture to prepare a cathode active material slurry.

The cathode active material slurry was coated in a loading amount of 3.15 mAh/cm$^2$ per one side of an aluminum current collector with a width of 34 mm, a length of 51 mm, and a thickness of 12 um, followed by drying, rolling, and blanking to a circular shape (diameter: 1.4 cm) to obtain a cathode of Example 1.

As an electrolyte, an electrolyte including a mixed solvent of ethylene carbonate (EC), diethylene carbonate (DEC) and dimethyl carbonate (DMC) at a volume ratio (EC:DEC: DMC) of 1:2;1, and including 1M of $LiPF_6$ and 10 wt % of fluoroethylene carbonate (FEC), based on the total weight of the electrolyte, was prepared.

Between the lithium metal anode of Example 1 and the cathode of Example 1, a separator (thickness: 20 um) made of polyethylene was interposed, and then the electrolyte was injected, and a CR2032 coin cell was manufactured according to a common method, thus obtaining a lithium metal battery of Example 2.

In the lithium metal battery of Example 2, the first pores (pores having relatively small diameters) of the anode current collector (Preparation Example 1) faced the lithium metal layer, and the second pores (pores having a relatively large diameters) of the anode current collector faced the separator.

Comparative Example 1

A lithium metal anode was prepared using the anode current collector (120) of Preparation Example 1, in a structure wherein the second pores (pores having relatively large diameters) of the anode current collector faced a lithium metal layer (110).

Specifically, as shown in FIG. 4b, a side (120b) on which the pores having relatively large diameters were positioned in the anode current collector of Preparation Example 1, and a lithium foil (thickness: 20 μm) were made to face each other, followed by roll pressing such that the current collector and the lithium metal layer were laminated without separation, and blanking to a circular shape (diameter: 1.5 cm), thus obtaining the lithium metal anode of Comparative Example 1.

Comparative Example 2

A lithium metal battery of Comparative Example 2 was obtained by the same method as Example 1, except that the lithium metal anode of Comparative Example 1 was used instead of the lithium metal anode of Example 1.

Experimental Example 1

In this experimental example, it is confirmed whether or not the cycle life characteristic varies according to the designing method of a lithium metal battery applying the anode current collector of Preparation Example 1.

Specifically, at 25° C., under the following conditions, charge/discharge was conducted until the operation of the batteries of Example 2 and Comparative Example 2 were finished, and the results are shown in FIGS. 5a to 5c.

Charge: 0.5C, CC/CV, 4.3 V, 0.05C cut-off
Discharge: 0.5C, CC, 3.0 V, cut-off

FIG. 5a shows the charge capacity according to the cycles of each battery, FIG. 5b shows the discharge capacity according to the cycles of each battery, and FIG. 5c shows the charge/discharge efficiency according to the cycles of each battery.

The lithium metal battery of Comparative Example 2 was designed such that the second pores (pores having relatively large diameters) of the anode current collector (Preparation Example 1) face a lithium metal layer, and the first pores (pores having relatively small diameters) of the anode current collector face a separator.

More specifically, in Comparative Example 2, the first pores facing a separator may be blocked because lithium ions cannot smoothly enter during the repeated charge/discharge process of the lithium metal battery.

To the contrary, the lithium metal battery of Example 2 was designed such that the second pores (pore having relatively large diameters) of the anode current collector (Preparation Example 1) face a separator, and the first pores (pores having relatively small diameters) of the anode current collector face a lithium metal layer.

More specifically, in Example 2, the second pores facing a separator provide a wide entrance where lithium ions (specifically, lithium ions derived from the electrolyte impregnated in the separator) can easily enter.

As such, the lithium ions entering the wide entrance (the second pores) pass through the holes of the anode current collector to move to a lithium metal layer. Herein, since the holes having gradually decreasing diameters while penetrating inside the anode current collector, from the wide entrance (the second pores) facing a separator to the narrow entrance (the first pores) facing a lithium metal layer, provide various directions and sufficient spaces where lithium ions can enter, local blocking can be inhibited during the repeated charge/discharge processes of a lithium metal battery.

Thus, if a lithium metal battery is designed as in Example 2 using the anode current collector of Preparation Example 1, reversibility of a lithium metal anode can be secured, and the cycle life characteristic of a lithium metal battery can be improved.

Practically, referring to FIGS. 5a to 5c, it can be confirmed that even if the anode current collector of Preparation Example 1 is commonly applied, in the lithium metal battery (Comparative Example 2) designed such that the first pores (pores having relatively small diameters) of the anode current collector face a separator, the operation was finished only after the 85th cycle; while in the lithium metal battery (Example 2) designed such that the second pores (pores having relatively large diameters) of the anode current collector face a separator, the operation was finished after further operation of about 20 cycles.

Experimental Example 2

In this experimental example, it is confirmed whether or not the initial properties vary according to the designing method of a lithium metal battery applying the anode current collector of Preparation Example 1.

Specifically, at 25° C., under the following conditions, charge/discharge was conducted until the operation of the batteries of Example 2 and Comparative Example 2 were finished, and the results are shown in FIGS. 6a and 6b.

Charge: 0.5C, CC/CV, 4.3 V, 0.05C cut-off
Discharge: 0.5C, CC, 3.0 V, cut-off

FIG. 6a shows the charge capacity according to the cycles of each battery, and FIG. 6b shows the discharge capacity according to the cycles of each battery.

Referring to FIGS. 6a and 6b, it can be confirmed that even if the anode current collector of Preparation Example 1 is commonly applied, in the lithium metal battery (Comparative Example 2) designed such that the first pores (pores having relatively small diameters) of the anode current collector of Preparation Example 1 face a separator, the charge capacity after the $1^{st}$ cycle was just 5.58 mAh, and the charge capacity after the 4th cycle was just 4.40 mAh, while in the lithium metal battery (Example 2) designed such that the second pores (pores having relatively large diameters) of the anode current collector of Preparation Example 1 face a separator, the charge capacity after the $1^{st}$ cycle amounted to 5.79 mAh, and the charge capacity after the 4th cycle amounted to 4.49 mAh.

EXPLANATION OF SYMBOLS

120: anode current collector
120a: side on which pores having relatively small diameters are positioned in the anode current collector (120)
120b: side on which pores having relatively large diameters are positioned in the anode current collector (120)
110: lithium metal layer

The invention claimed is:

1. An anode for a lithium metal battery, comprising
an anode current collector; and
a lithium metal layer positioned on the anode current collector,
wherein the anode current collector comprises:
a metal plate having a first side and a second side,
wherein the metal plate has a thickness ranging from 100 µm to 150 µm; and
multiple holes that, independently from each other, form first pores on the first side of the metal plate and form corresponding second pores on the second side of the metal plate,
wherein a diameter of the second pores is larger than a diameter of the corresponding first pores,
wherein the holes penetrate inside the metal plate and connect the first pores and the second pores, and
wherein the lithium metal layer faces the first pores of the anode current collector and is arranged only on the first side of the metal plate,
wherein the multiple holes, independently from each other, have a gradually decreasing constant diameter slope from the diameter of the second pore to the diameter of the first pore while penetrating inside the metal plate,
wherein the multiple holes, independently from each other, have an increasing diameter by 0.1 µm to 3 µm per 1 µm thickness of the metal plate from the diameter of the first pores to the diameter of the second pores,
wherein the diameter of each of the first pores is independently 50 µm to 70 µm and wherein the diameter of each of the second pores is independently 200 µm to 350 µm.

2. The anode for the lithium metal battery according to claim 1, wherein the multiple holes are, independently from each other, formed using soft molding, self-assembly of spherical particles, or photolithography.

3. The anode for the lithium metal battery according to claim 1, wherein the multiple holes are, independently from each other, in the shape of a circular truncated cone, an elliptic truncated cone, or a truncated polypyramid.

4. The anode for the lithium metal battery according to claim 1, wherein a volume occupied by the multiple holes in a total volume of 100 vol % including the metal plate and the multiple holes is 50 vol % to 90 vol %.

5. The anode for the lithium metal battery according to claim 1, wherein the metal plate comprises one or more selected from the group consisting of copper, an alloy of copper and other metals.

6. The anode for the lithium metal battery according to claim 1, wherein the metal plate is selected from the group consisting of a metal film, a metal sheet, or a metal foil.

7. A lithium metal battery comprising:
an anode,
wherein the anode comprises an anode current collector; and
a lithium metal layer positioned on the anode current collector,
wherein the anode current collector comprises: a metal plate having a first side and a second side, wherein the metal plate has a thickness ranging from 100 µm to 150 µm; and multiple holes that, independently from each other, form first pores on the first side of the metal plate and form corresponding second pores on the second side of the metal plate,
wherein a diameter of the second pores is larger than a diameter of the corresponding first pores,
wherein the holes penetrate inside the metal plate and connect the first pores and the second pores,
wherein the multiple holes, independently from each other, have a gradually decreasing constant diameter slope from the diameter of the second pore to the diameter of the first pore while penetrating inside the metal plate, wherein the multiple holes, independently from each other, have an increasing diameter by 0.1 µm to 3 µm per 1 µm thickness of the metal plate from the diameter of the first pores to the diameter of the second pores, wherein the diameter of each of the first pores is independently 50 µm to 70 µm and wherein the diameter of each of the second pores is independently 200 µm to 350 µm, and
wherein the lithium metal layer faces the first pores of the anode current collector and is arranged only on the first side of the metal plate;
a separator facing the second pores of the anode current collector;
an electrolyte impregnated in the separator; and
a cathode facing the other side of the separator.

8. An anode for a lithium metal battery, comprising
an anode current collector; and
a lithium metal layer positioned on the anode current collector,
wherein the anode current collector comprises:
a metal plate having a first side and a second side,
wherein the metal plate has a thickness ranging from 100 µm to 150 µm; and
multiple holes that, independently from each other, form first pores on the first side of the metal plate and form corresponding second pores on the second side of the metal plate,
wherein a diameter of the second pores is larger than a diameter of the corresponding first pores,
wherein the holes penetrate inside the metal plate and connect the first pores and the second pores, and
wherein the lithium metal layer faces the first pores of the anode current collector and is arranged only on the first side of the metal plate,
wherein the multiple holes, independently from each other, have a gradually decreasing constant diameter slope from the diameter of the second pore to the diameter of the first pore while penetrating inside the metal plate, wherein the slope of the diameter of the hole is 40° to 60°,
wherein the multiple holes, independently from each other, have an increasing diameter by 0.1 µm to 3 µm per 1 µm thickness of the metal plate from the diameter of the first pores to the diameter of the second pores, wherein the diameter of each of the first pores is independently 50 µm to 70 µm and wherein the diameter of each of the second pores is independently 200 µm to 350 µm.

* * * * *